US012709228B2

(12) United States Patent
Harmon

(10) Patent No.: US 12,709,228 B2
(45) Date of Patent: Aug. 18, 2026

(54) VEHICLE CONSOLE HAVING DEPLOYABLE DEVICE HOLDER

(71) Applicant: Ford Global Technologies, LLC, Dearborn, MI (US)

(72) Inventor: Michael John Harmon, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 466 days.

(21) Appl. No.: 18/335,587

(22) Filed: Jun. 15, 2023

(65) Prior Publication Data

US 2024/0416842 A1 Dec. 19, 2024

(51) Int. Cl.
*B60R 7/04* (2006.01)
*B60R 11/00* (2006.01)
*B60R 11/02* (2006.01)

(52) U.S. Cl.
CPC ............ *B60R 7/04* (2013.01); *B60R 11/0229* (2013.01); *B60R 2011/0007* (2013.01)

(58) Field of Classification Search
CPC .................................. B60N 2/79; B60N 2/793
See application file for complete search history.

(56) References Cited

U.S. PATENT DOCUMENTS 5,177,616 A * 1/1993 Riday ...................... H04N 5/64 348/827
5,179,447 A * 1/1993 Lain ....................... A47C 7/723 348/827
5,338,081 A * 8/1994 Young ........................ B60R 7/04 297/188.13
5,556,017 A * 9/1996 Troy ................... B60R 11/0241 297/188.17
5,836,496 A * 11/1998 Levin .................. B60R 11/0241 379/426
5,996,866 A * 12/1999 Susko ................. B60R 11/0241 224/570
6,273,310 B1 * 8/2001 Gregory .................. B60R 7/005 224/282
6,663,155 B1 * 12/2003 Malone ............... B60R 11/0229 224/539

(Continued)

FOREIGN PATENT DOCUMENTS

CN 209336614 U 9/2019
EP 0976616 A1 * 2/2000 ......... B60R 11/0235

(Continued)

OTHER PUBLICATIONS

Translation of EP 0976616 (Year: 2000).*
Translation of FR 2917352 (Year: 2008).*

*Primary Examiner* — Amy R Weisberg
*Assistant Examiner* — Veronica M Condo
(74) *Attorney, Agent, or Firm* — Vichit Chea; Price Heneveld LLP

(57) ABSTRACT

A vehicle console having a housing comprising a storage compartment having an access opening on a top side, a lid coupled to the housing for covering the access opening of the storage compartment, and a device holder configured to hold an electronic display device and pivotally coupled to the housing to pivot between a stowed position in the storage compartment and a deployed position extending outward above the housing.

18 Claims, 7 Drawing Sheets

(56) References Cited

U.S. PATENT DOCUMENTS 6,719,343 B2 * 4/2004 Emerling ................ B60R 11/00 224/555
6,945,582 B2 * 9/2005 Chen ....................... B60R 11/02 297/188.17
7,114,755 B1 * 10/2006 Sturt ...................... B60N 3/102 296/24.34
7,413,229 B2 * 8/2008 Kukucka ................ B60N 2/793 296/1.09
7,455,016 B2 * 11/2008 Perin ........................ B60N 2/79 312/307
7,520,552 B2 * 4/2009 Nakamura ................ B60R 7/04 108/44
8,659,554 B2 2/2014 Quigley et al.
8,727,413 B2 * 5/2014 Seiller ..................... B60R 13/00 296/24.34
8,816,636 B2 * 8/2014 Shinde ................ B60R 11/0241 320/108
9,038,842 B2 * 5/2015 Doll .......................... B60R 7/06 220/264
10,457,710 B2 * 10/2019 Mysore Vishakante Gowda ........ C07K 14/415
10,493,922 B2 * 12/2019 Perez ..................... B60N 3/103
10,513,336 B2 * 12/2019 Peuziat .............. B64D 11/0646
10,710,473 B2 * 7/2020 Hagedorn ............ B60N 2/0292
10,814,797 B2 * 10/2020 Thain .................. B60R 11/0252
11,524,580 B2 12/2022 Larry et al.
11,541,784 B2 * 1/2023 Powell ..................... B60N 2/32
11,643,019 B2 * 5/2023 Rhee ......................... B60R 7/04 296/24.34
11,787,348 B2 * 10/2023 Dessapt .............. B60R 11/0235 455/575.9
12,296,752 B2 * 5/2025 Gimenez ................ B41J 29/023
12,434,636 B2 * 10/2025 Kang ........................ B60R 7/04
2004/0189797 A1 * 9/2004 Todd ................... B60R 11/0235 348/148
2004/0217615 A1 * 11/2004 Lindstrom ................ B60R 7/04 224/275
2005/0230993 A1 * 10/2005 Dry ......................... B60R 11/00 296/37.8
2007/0069544 A1 * 3/2007 Sturt ......................... B60R 7/04 296/37.8
2007/0171316 A1 7/2007 Mathias et al.
2016/0365744 A1 * 12/2016 Hyun ...................... B60R 16/03

FOREIGN PATENT DOCUMENTS

FR 2917352 A1 * 12/2008 ............... B60R 7/04
GB 2400229 A 10/2004
JP 5725259 4/2015
WO 2004039625 A1 5/2004

* cited by examiner

VEHICLE CONSOLE HAVING DEPLOYABLE DEVICE HOLDER

FIELD OF THE DISCLOSURE

The present disclosure generally relates to vehicle consoles, and more specifically relates to a console having a device holder for holding a display device on a vehicle.

BACKGROUND OF THE DISCLOSURE

Motor vehicles are commonly equipped with storage compartments, such as consoles. For example, a center console is often installed between a driver seat and a passenger seat in a row of seating in a passenger motor vehicle. The center console typically has a main storage compartment with a lid which also commonly serves as an armrest and may include one or more drink holders and other storage compartments. It would be desirable to provide for a center console which deploys an electronic device for use on a motor vehicle.

SUMMARY OF THE DISCLOSURE

According to a first aspect of the present disclosure, a vehicle console including a housing is provided. The storage compartment has an access opening on a top side, a lid coupled to the housing for covering the access opening of the storage compartment, and a device holder configured to hold an electronic display device and pivotally coupled to the housing to pivot between a stowed position in the storage compartment and a deployed position extending outward above the housing.

Embodiments of the first aspect of the present disclosure can include any one or a combination of the following features:

- the device holder comprises a pivot connection that allows the device holder to pivot to the stowed position within the storage compartment when the lid is in an open position, and wherein the device holder may be in the deployed position when the lid in a closed position;
- a hinge couples the lid to the housing, wherein the lid pivots about the hinge on a front side of the access opening and the device holder pivots about a rear side of the access opening;
- the pivot connection comprises at least one pivot pin engaging holes on opposite lateral sides of the device holder;
- the device holder comprises a frame for receiving the electronic display device and removably holding the display device;
- the frame engages the electronic device in a fixed position;
- the device holder further comprises a slot configured to allow a cable to connect the display device to a port on the housing;
- the lid provides an armrest on a top surface in the closed position;
- the lid provides a work surface on a top surface in the open position; and
- the console is a center console.

According to a second aspect of the present disclosure, a vehicle center console includes a housing that comprises a storage compartment having an access opening on a top side. A hinge is coupled to the housing on a first side of the access opening, a lid is coupled to the hinge and pivotable between a closed position to cover the access opening of the storage compartment and an open position. A pivot connection is coupled to the housing on a second side of the access opening, and a device holder is connected to the pivot connection and configured to hold a display device and is pivotally coupled to the housing to pivot between a stowed position in the storage compartment and a deployed position extending outward above the housing.

Embodiments of the second aspect of the disclosure can include one or a combination of the following features:

- the second side is a rear side of the access opening;
- the first side is a front side of the access opening;
- the pivot connection allows the device holder to pivot to the stowed position within the storage compartment when the lid is in the open position, and wherein the device holder may be in the deployed position when the lid is in the closed position;
- the pivot connection comprises at least one pivot pin engaging holes on opposite lateral sides of the device holder;
- the device holder comprises a frame for receiving a display device and for removably holding the display device;
- the frame engages the electronic device in a fixed position;
- the device holder further comprises a slot configured to allow a cable to connect the display device to a port on the housing;
- the lid provides an armrest on a top surface in the closed position; and
- the lid provides a work surface on a top surface in the open position.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
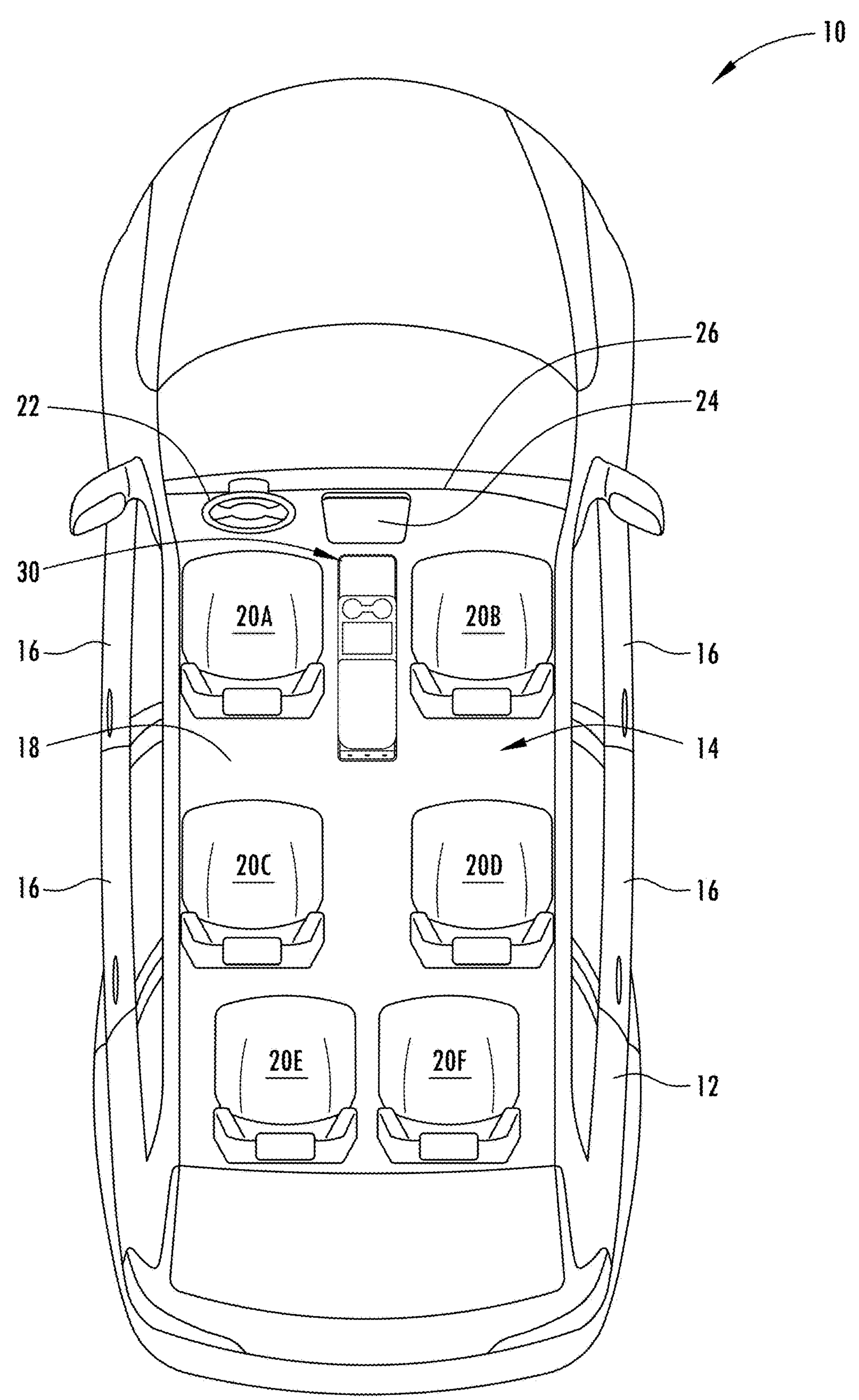
FIG. 1 is an upper side perspective view of a cabin interior of a motor vehicle equipped with a front center console, according to one example.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower." "right." "left." "rear," "front." "vertical." "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle console having a deployable device holder. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises." "comprising." or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about." and one not modified by "about." It will be further understood that the end-points of each of the ranges are significant both in relation to the other end-point, and independently of the other end-point.

The terms "substantial," "substantially." and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a wheeled automotive or motor vehicle 10 is generally illustrated configured with passenger seating for transporting one or more passengers including a driver of the vehicle 10 and for further transporting one or more items onboard the vehicle 10. The motor vehicle 10 has a vehicle body 12 that generally defines a cabin interior 14. The cabin interior 14 may contain various features and trim components. The cabin interior 14 is shown having an arrangement of front row passenger seats including a first seat assembly 20A configured to seat a driver and a second seat assembly 20B configured to seat a passenger. The first and second seat assemblies 20A and 20B may be configured as captain seats, for example, laterally spaced apart and separated by a space that includes a center console 30 that may be configured according to the embodiment shown and described herein. The motor vehicle 10 illustrated in the example also includes additional seating such as a second row of seating including third and fourth seat assemblies 20C and 20D shown, and a third row of seating including fifth and sixth seat assemblies 20E and 20F. The motor vehicle 10 may include additional seating as is common for a large van or bus. It should be appreciated that the vehicle 10 may be a motor vehicle, such as a wheeled car, truck, SUV, van or bus, for example, or an airplane, train, boat or other vehicle capable of transporting one or more passengers and items.

The motor vehicle 10 is illustrated with the front row of seating having the first seat assembly 20A located on one lateral side (e.g., the left side) of the first row and vehicle rearward of a dashboard 26 and a steering wheel 22 and configured for seating a driver of the vehicle 10. The first seat assembly 20A includes a seat base and a seat back. The second seat assembly 20B is shown positioned vehicle rearward of the dashboard 26 on the opposite lateral side (e.g., right side) of the front row of seating and has a seat base and a seat back configured for seating a passenger. The vehicle body 12 has a plurality of side doors 16 that allow the driver and passengers to enter and exit the cabin interior 14 to access the seat assemblies 20A-20F. In the example shown, the driver seat assembly 20A is located adjacent to a lateral left side door 16 and the passenger seat assembly 20B is located adjacent to an opposite lateral right side door 16. Passengers may gain access to or exit from the second and third rows of seat assemblies 20C-20F via the rear side doors 16.

The cabin interior 14 is shown equipped with a center console 30 located in the space between the driver first seat assembly 20A and the passenger second seat assembly 20B in the front first row of seating. In addition, the cabin interior 14 may also include one or more additional consoles such as a rear center console (not shown) located in a space between the third and fourth seat assemblies 20C and 20D in the middle second row of seating. It should be appreciated that the center console 30 may be located at various locations within the vehicle 10, such as between other adjacent seat assemblies. For example, a vehicle console in the form of a center console may be located in a space between the fifth and sixth seat assemblies 20E and 20F in the rear third row of seating.

The vehicle console 30 is shown is shown and described as a center console located adjacent to a pair of vehicle seating assemblies in the motor vehicle 10 that offers various features and accessories. The vehicle console 30 is configured with a deployable device holder that may hold a display device that may be moved between a stowed position with a housing defining the storage compartment and a deployed position extending outward from the housing, generally above and under a rear end. The vehicle console 30 may provide storage space such as one or more compartments for storing one or more items on the motor vehicle 10. In addition, the vehicle console 30 may provide an armrest for a driver or passenger of the motor vehicle 10 to rest their arm upon. Further, the vehicle console 30 may include a worktable that provides a worksurface upon which a user may utilize for purposes of work, for example.

The vehicle console 30 is shown in FIGS. 2-7 having a housing 32 with upstanding side walls generally defining an internal main first storage compartment 36 for storing one or more items including an electronic display device 90 attached to a device holder. The housing 32 generally includes a front, rear and side walls. The housing 32 has an access opening 34 provided on the top side which allows access to the storage compartment 36. In the example shown, the storage compartment 36 is generally rectangular in cross section, however, it should be appreciated that various other shapes and sizes of storage compartments may be provided.

The vehicle console 30 is also equipped with a second storage compartment 46 on the front side thereof which may serve as a tray generally having upstanding walls that define the storage area. A plurality of cup holders 48 also provided on an upper forward side of the vehicle console 30. A further third storage compartment 44 in the form of a tray is further located vehicle rearward of the cup holders 48 and forward of the main storage compartment 46 in the example shown. The housing 32 may be fixedly attached to and supported on a vehicle floor 18.

Figure 2:
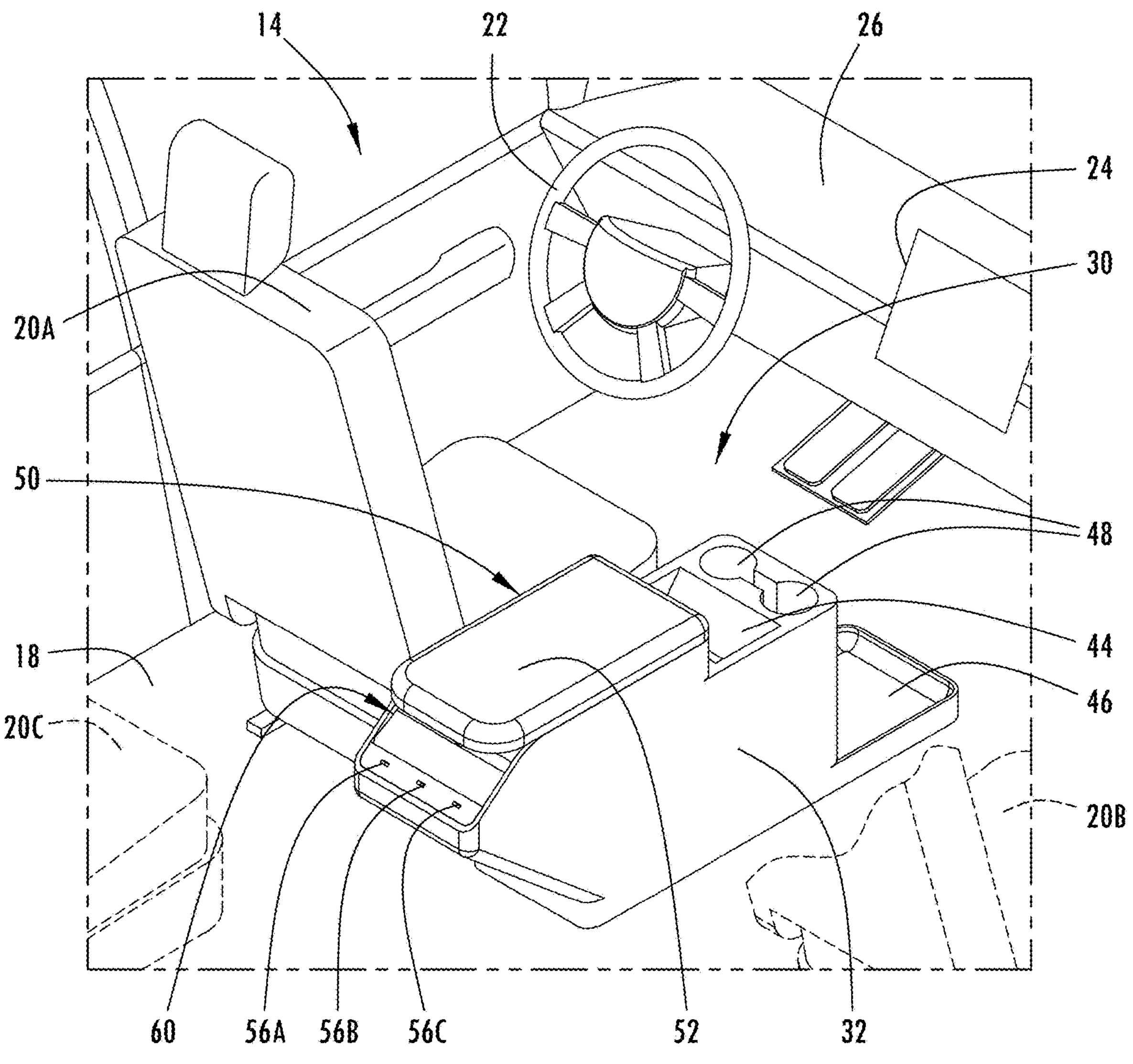
FIG. 2 is a rear perspective view of the cabin interior showing a first embodiment of the center console configured with a deployable device holder in a stowed position and the lid in a closed position.

The vehicle console 30 also includes a lid 50 which, in a closed position, as seen in FIG. 2 covers the access opening 34. The lid 50 has a soft, e.g., foam-based, upper surface that may be used as an armrest by either a driver seated in driver seat assembly 20A or a passenger seated in passenger seat assembly 20B. The lid 50 is hingedly connected to the housing 32 at or near the front edge of the access opening 34 via a hinge 38 or a plurality of hinges. As such, the lid 50 may be rotated about the hinge 38 by approximately 180° between the closed position shown in FIG. 2 and a forward rotated fully open position shown in FIG. 3. In the fully open position, the lid 50 has a work surface 54 that is presented facing upward to allow a driver or passenger to utilize the lid 50 as a worksurface or a table. In the fully open position, the lid 50 may rest upon a forward portion of the housing 32 generally defining the storage compartment 46 and cup holders 48.

Figure 3:
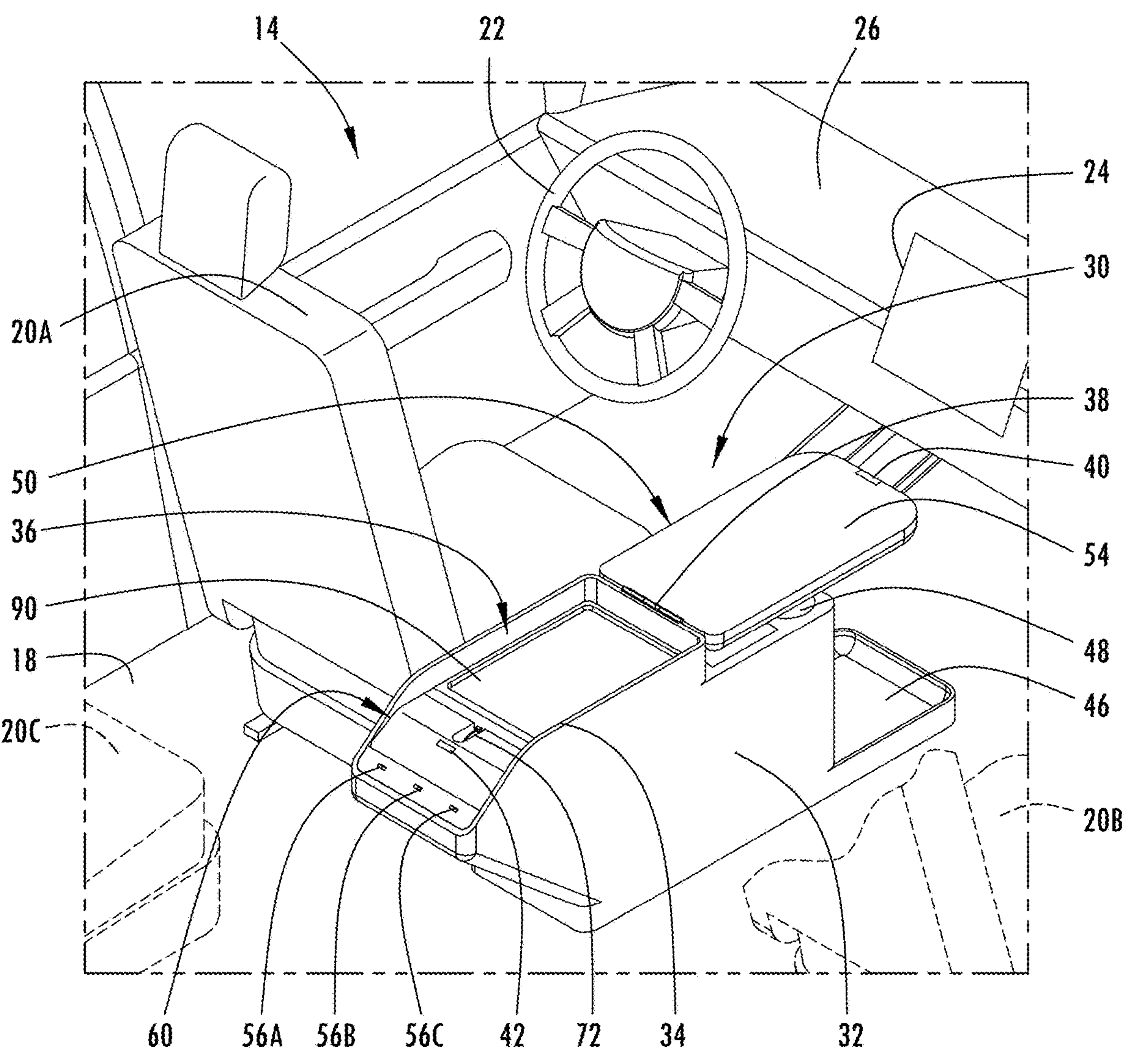
FIG. 3 is a rear perspective view of the cabin interior showing the center console with the lid in the forward open position and the device holder in the stowed position.
Figure 4:
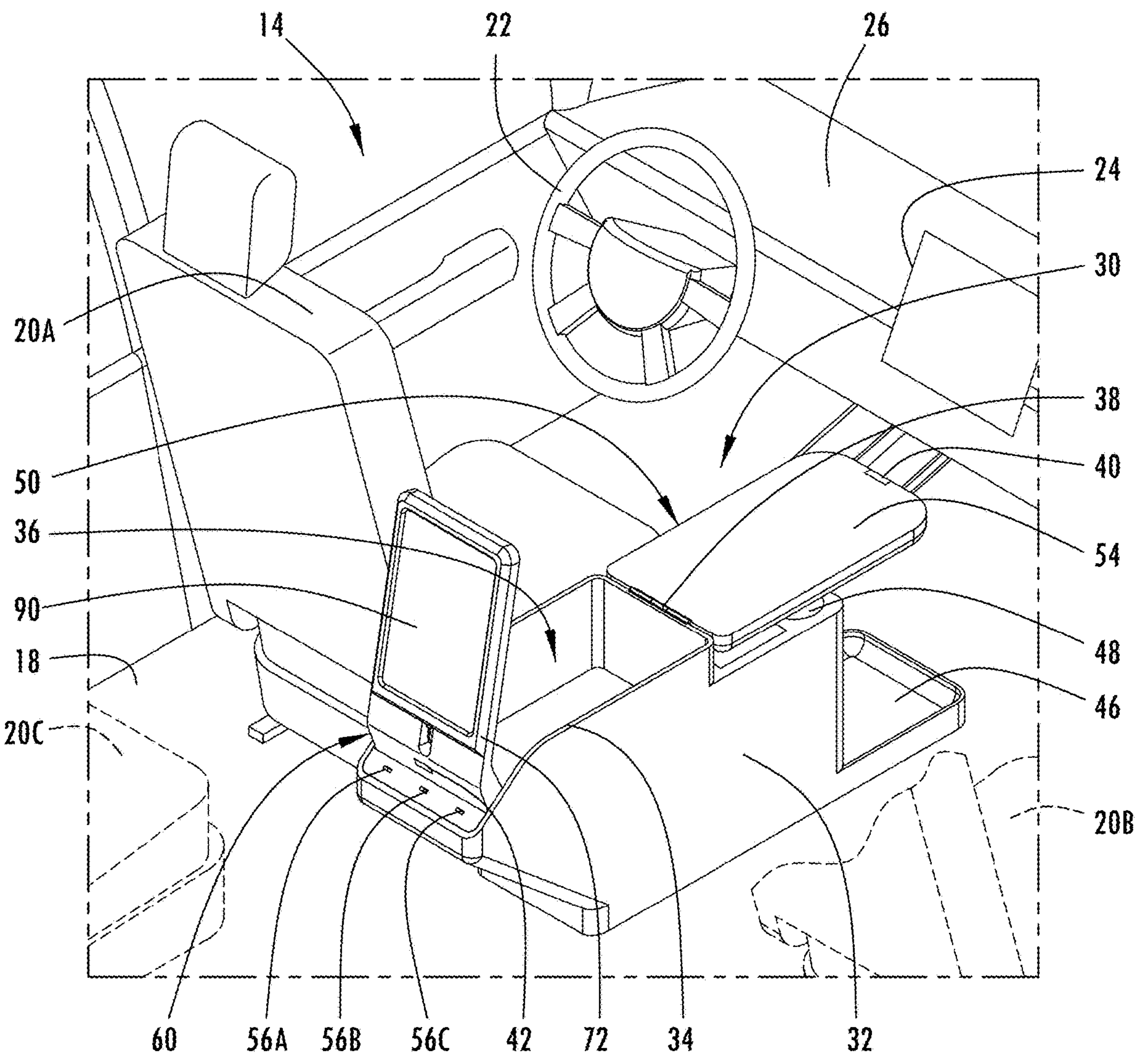
FIG. 4 is a rear perspective view of the cabin interior showing a display device on the device holder in a deployed position with the lid in the open position.

The vehicle console 30 includes a device holder 60 configured to hold an electronic display device 90. The device holder 60 is pivotally coupled to the housing 32 at or near a rear edge of the access opening 34 and is configured to pivot between a stowed position as shown in FIG. 3 and a deployed position extending outward above the housing 32 proximate the rear end of the housing as shown in FIG. 4. The device holder 60 is a pivoting display screen holder that may hold an electronic display device, such as a tablet, for example, an iPad, a phone or other electronic device that may be removable and storable within the storage compartment 36. The device holder 60 includes a base support member 62 having a back support wall 70 extending therefrom. The base support member 62 includes a pair of receiver openings 64A and 64B on opposite lateral sides which are configured with a shaped and size to receive respective pivot pins 68A and 68B, which are biased via respective springs 66A and 66B. The pivot pins 68A and 68B may be depressed laterally inward during installation so as to position the pivot pins 68A and 68B within respective openings 65A and 65B formed on inner walls of the housing 32 within the storage compartment 36 at the rear end thereof. Once the pivot pins 68A and 68B are inserted within openings 65A and 65B, the bias spring 66A and 66B bias forces the pins 68A and 68B to remain in attachment with the housing 32.

The device holder 60 further includes a housing 74 with bumper frame 76 having a slot 78 configured to engage the back support wall 70. A display device 90, such as a tablet, e.g., an iPad, phone, or other electronic device may be removably connected to the bumper frame 76 and engaged within slot 78 to hold the display device 90 onto the bumper frame 76. The bumper frame 76 with the display device 90 attached thereto may then be inserted onto the back support wall 70 of the base member 62.

Referring to FIG. 3, the device holder 60 is shown in the stowed position having a display device 90 stored substantially horizontally within the storage compartment 36 with the lid 50 in the open position. It should be appreciated that the device holder 60 and display device 90 may be further rotated downward into the storage compartment 36 to a lower stowed position. To deploy the device holder 60 to a use position as seen in FIG. 4, a user may rotate the device holder 60 upward and vehicle rearward manually to position the device holder 60 and display device 90 in a use position extending from the housing 32 above and/or rearward of the housing and viewable by a user from the rear seating area of the vehicle 10. Alternately, it should be appreciated that the device holder 60 may be actuated via an actuator, such as an electric motor to move the device holder 60 with the display device 90 between the stowed and deployed positions in response to a user or vehicle system input command, for example.

Figure 5:
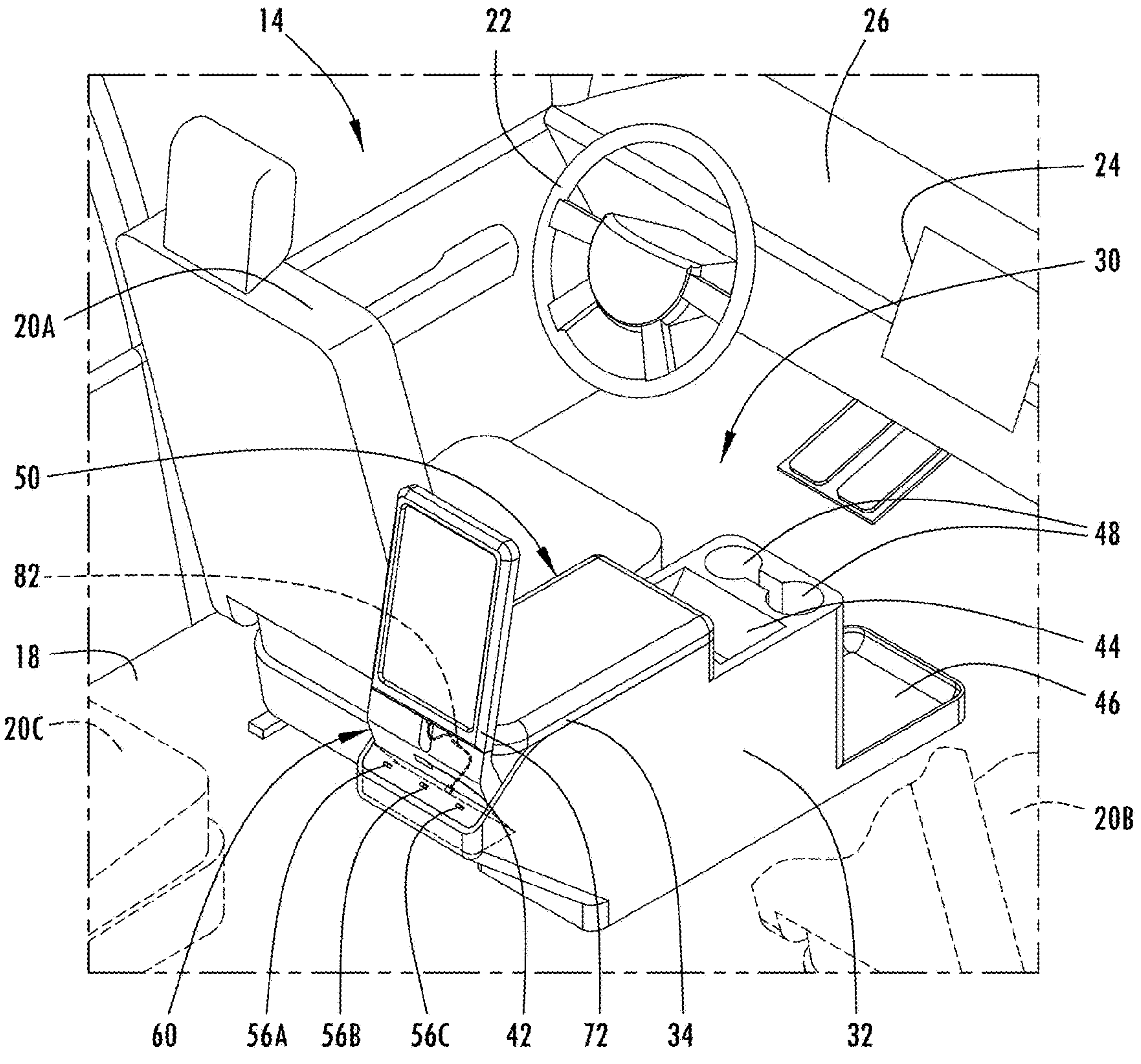
FIG. 5 is a rear perspective view of the cabin interior showing the display device with the device holder in the deployed position and the lid in the closed position.
Figure 6:
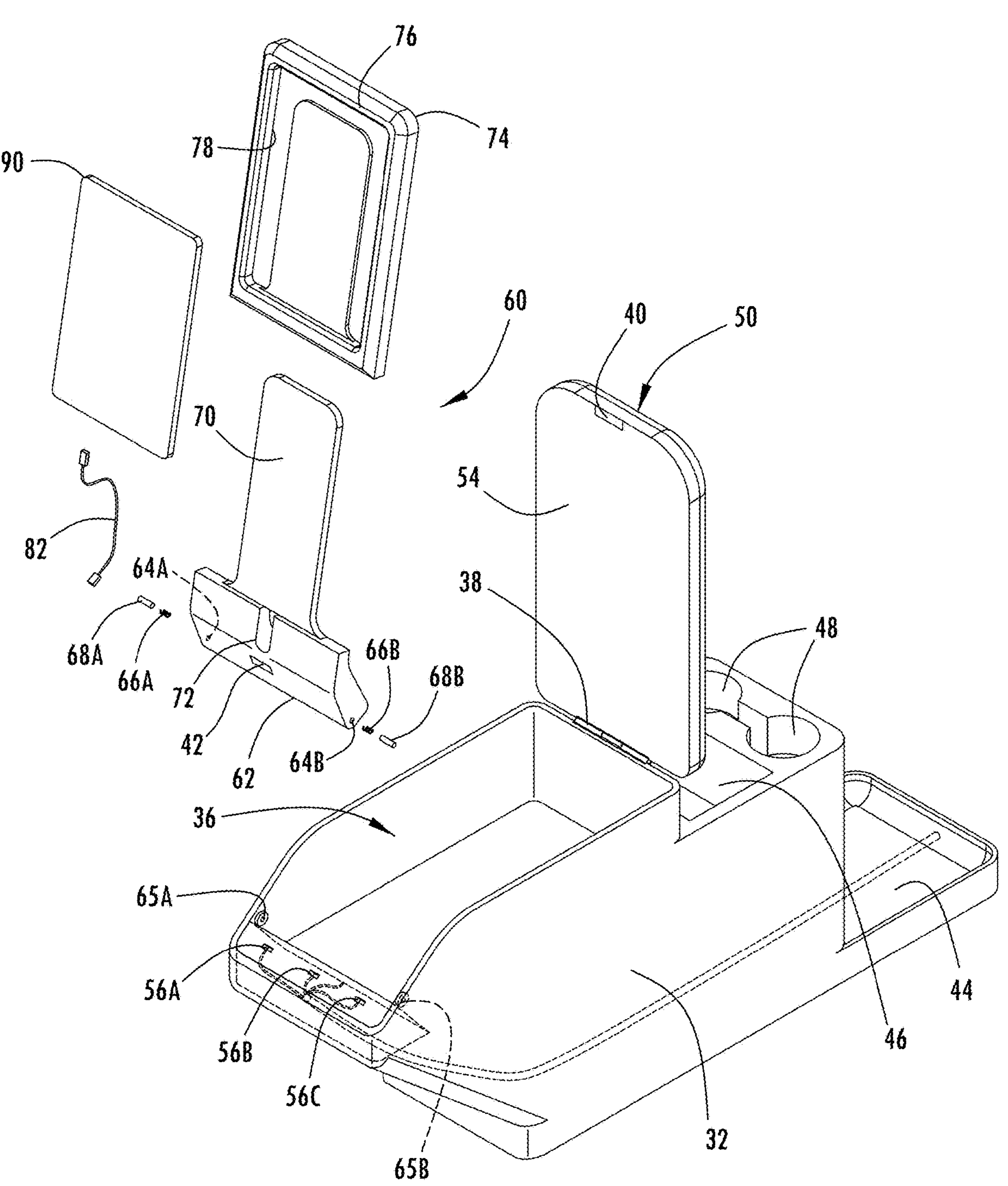
FIG. 6 is an exploded view of the center console and device holder.

The device holder 60 may be placed in the deployed position and utilized to display the display device 90 with the lid 50 in the open position as seen in FIG. 4. Additionally, the lid 50 may be moved to the closed position as seen in FIG. 5 with the device holder 60 in the deployed position. In this position, the device holder 60 extends upstanding above the housing 32 and/or rearward of the lid 50 so as not to interfere with the movement of the lid 50 between the open and closed positions.

Figure 7:
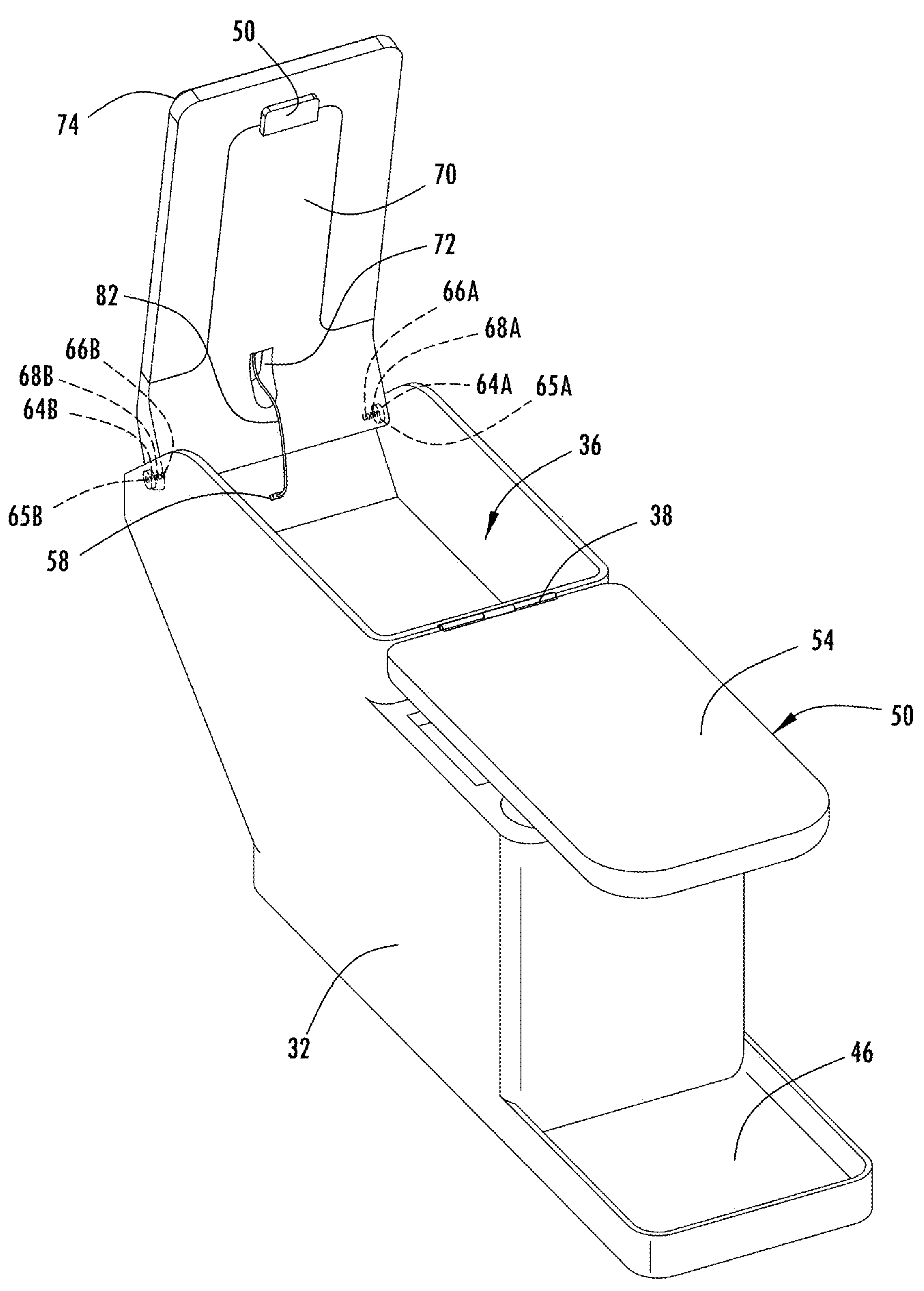
FIG. 7 is a front perspective view of the center console as shown in FIG. 4 with the device holder in the deployed position and the lid in the forward open position.

The electronic device 90 may be operated via its own battery power source or it may be powered and/or charged via the vehicle power supply by using a cable 82 that connects to one or more electrical ports on the housing 32 of the vehicle 10. For example, cable 82 may be connected to one of a plurality of USB external ports 56A-56C shown located on the rear end of the housing 32 generally below the device holder 60. In addition, the storage compartment 36 may include an internal electrical port shown as a USB port 58 as seen in FIG. 7. The base member 62 of the device holder 60 may further include a slot 78 formed in a lower portion for allowing the cable 82 to extend from the electronic display device 90 into a connection with one or more of the ports such as the internal port 58 as shown in FIG. 7. With the cable 82 connected to the electronic display device 90 and one of the ports, the electronic display device 90 may receive electrical power and may communicate data via cable 82 to the USB ports 58 via the wired connection or may utilize a wireless communication.

Accordingly, the vehicle console 30 advantageously includes a device holder 60 that may hold and position a display device 90 in either a stowed position within the console 30 or a deployed position extending rearward and/or above the console 30. A user onboard the vehicle 10 may advantageously bring their own electronic display device onboard the vehicle 10 and connect it to the device holder 60 and utilize the device 90 while seated in the back seating area of the vehicle 10. A driver of the vehicle 10, such as an operator of a drive service, such as Uber Lyft, for example, may utilize the device holder 60 to hold an electronic device 90 for conducting business, such as for customer inputs and outputs for receiving instructions and for paying for the service, for example. When the electronic display device 90 is no longer needed for use, the lid 50 may be opened and the device holder 60 and electronic display device 90 may be rotated to the stowed position and the lid 50 closed such that the display device 90 is no longer visible.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle console comprising:

a compartment housing comprising a storage compartment having an access opening on a top side;

a lid coupled to the compartment housing for covering the access opening of the storage compartment; and a device holder configured to hold an electronic display device and pivotally coupled to the compartment housing to pivot between a stowed position in the storage compartment and a deployed position extending outward above the compartment housing, wherein the device holder comprises a back support wall and a holder housing configured to engage the back support wall, the holder housing having a bumper frame having a slot, wherein the electronic display device is removably connected to the bumper frame and engaged within the slot and is supported on a back side by the back support wall engaged in the slot.

2. The vehicle console of claim 1, wherein the device holder comprises a pivot connection that allows the device holder to pivot to the stowed position within the storage compartment when the lid is in an open position, and wherein the device holder may be in the deployed position when the lid is in a closed position.

3. The vehicle console of claim 2 further comprising a hinge coupling the lid to the compartment housing, wherein the lid pivots about the hinge on a front side of the access opening and the device holder pivots about a rear side of the access opening.

4. The vehicle console of claim 2, wherein the pivot connection comprises at least one pivot pin engaging holes on opposite lateral sides of the device holder.

5. The vehicle console of claim 1, wherein the bumper frame engages the electronic device in a fixed position.

6. The vehicle console of claim 1, wherein the device holder further comprises a cable slot configured to allow a cable to connect the display device to a port on the compartment housing.

7. The vehicle console of claim 1, wherein the lid provides an armrest on a top surface in the closed position.

8. The vehicle console of claim 7, wherein the lid provides a work surface on a top surface in the open position.

9. The vehicle console of claim 1, wherein the console is a center console.

10. A vehicle center console comprising:

a compartment housing comprising a storage compartment having an access opening on a top side;

a hinge coupled to the compartment housing on a first side of the access opening;

a lid coupled to the hinge and pivotable between a closed position to cover the access opening of the storage compartment and an open position;

a pivot connection coupled to the compartment housing on a second side of the access opening; and a device holder connected to the pivot connection and configured to hold a display device and pivotally coupled to the compartment housing to pivot between a stowed position in the storage compartment and a deployed position extending outward above the housing, wherein the device holder comprises a back support wall and a holder housing configured to engage the back support wall, the holder housing having a bumper frame having a slot, wherein the electronic display device is removably connected to the bumper frame and engaged within the slot and is supported on a back side by the back support wall engaged in the slot.

11. The vehicle center console of claim 10, wherein the second side is a rear side of the access opening.

12. The vehicle center console of claim 11, wherein the first side is a front side of the access opening.

13. The vehicle center console of claim 10, wherein the pivot connection allows the device holder to pivot to the stowed position within the storage compartment when the lid is in the open position, and wherein the device holder may be in the deployed position when the lid is in the closed position.

14. The vehicle center console of claim 10, wherein the pivot connection comprises at least one pivot pin engaging holes on opposite lateral sides of the device holder.

15. The vehicle center console of claim 10, wherein the bumper frame engages the electronic device in a fixed position.

16. The vehicle center console of claim 10, wherein the device holder further comprises a cable slot configured to allow a cable to connect the display device to a port on the compartment housing.

17. The vehicle center console of claim 10, wherein the lid provides an armrest on a top surface in the closed position.

18. The vehicle center console of claim 17, wherein the lid provides a work surface on a top surface in the open position.

* * * * *